United States Patent [19]

Revak et al.

[11] Patent Number: 5,421,702

[45] Date of Patent: Jun. 6, 1995

[54] LUBRICANT PUMP FOR A TURBINE

[75] Inventors: Lynn A. Revak, La Porte; Michael M. Calistrat, Missouri City, both of Tex.

[73] Assignee: Revak Turbomachinery Services, Inc., La Porte, Tex.

[21] Appl. No.: 223,555

[22] Filed: Apr. 6, 1994

[51] Int. Cl.[6] .............................................. F01D 25/20
[52] U.S. Cl. ..................................... 415/175; 415/36; 417/310; 417/311; 184/6.28
[58] Field of Search ...................... 415/175, 36, 42, 43; 418/166; 417/310, 311; 184/6.11, 6.28

[56] References Cited

U.S. PATENT DOCUMENTS

| | | | |
|---|---|---|---|
| 848,157 | 3/1907 | Callan et al. | 415/175 |
| 905,791 | 12/1908 | Callan et al. | 415/175 |
| 1,676,935 | 7/1928 | Taylor | 415/175 |
| 2,124,395 | 7/1938 | Caughey | 415/175 |
| 2,255,439 | 9/1941 | Schmidt | 415/175 |
| 4,284,386 | 8/1981 | Hudson | 417/310 |

FOREIGN PATENT DOCUMENTS

| | | | |
|---|---|---|---|
| 237281 | 10/1991 | Japan | 417/310 |
| 252398 | 1/1927 | United Kingdom | 184/6.28 |

*Primary Examiner*—Edward K. Look
*Assistant Examiner*—James A. Larson
*Attorney, Agent, or Firm*—Bush, Moseley, Riddle & Jackson

[57] ABSTRACT

A lubricant pump (24) for supplying pressurized lubricant to the main bearings (14) of a drive shaft (12) for a steam turbine (10) as shown in FiG. 1. A lubricant pump (24) is positioned between a governor (18) and an adjacent bearing (14) with the governor (18) and lubricant pump (24) being driven from the turbine shaft (12). The lubricant pump (24) has an outer housing (56) with a pair of opposed parallel mounting faces (58, 60) for mounting against a planar end face (48) of a bearing housing (44) on one side of lubricant pump (24) and an opposed planar face (38) of governor (18) on the other side of lubricant pump (24). Lubricant pump (24) comprises a rotary gear pump and may be easily installed on an existing turbine (10) having a governor (18) mounted on a bearing housing (44). Lubricant pump (24) includes gears (90, 92) to supply pressurized fluid through lubricant lines (30, 32) to bearings (14).

18 Claims, 5 Drawing Sheets

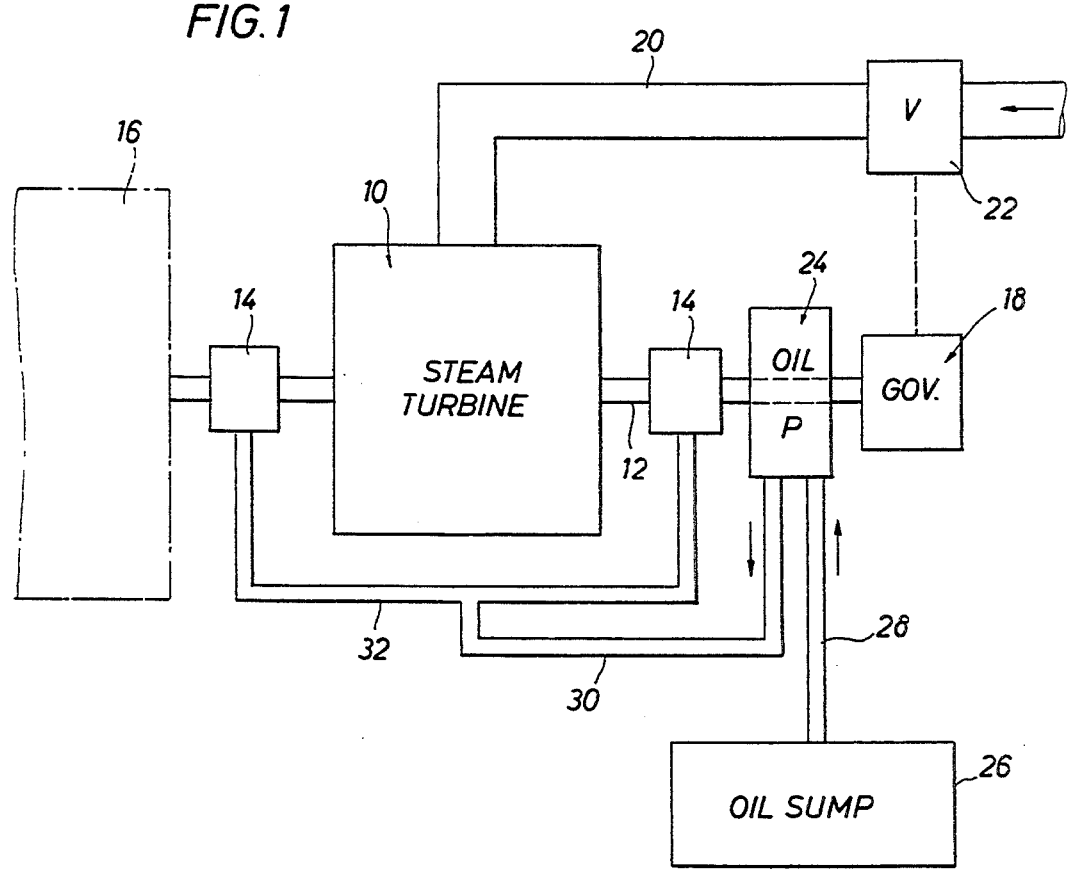
FIG. 1
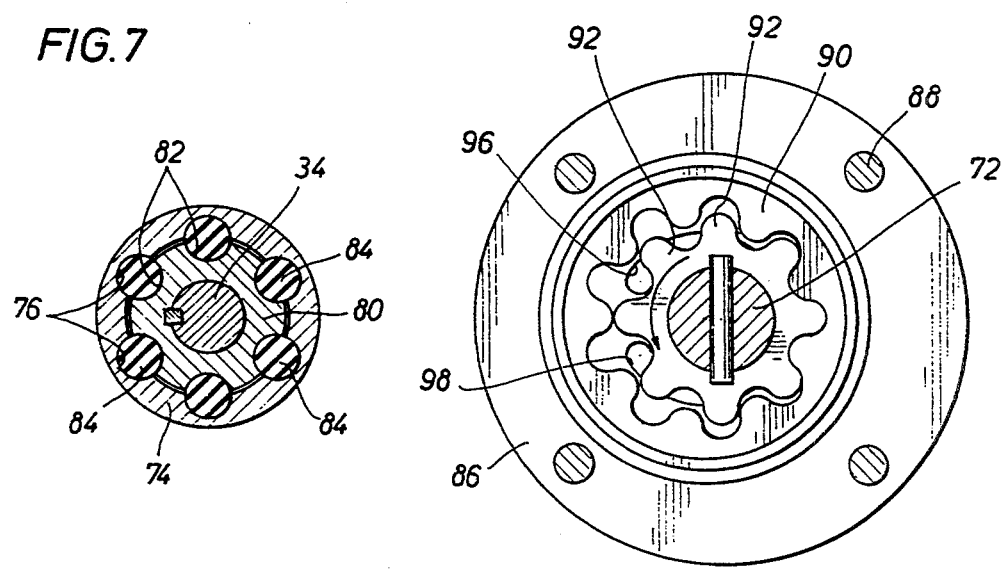
FIG. 7
FIG. 8

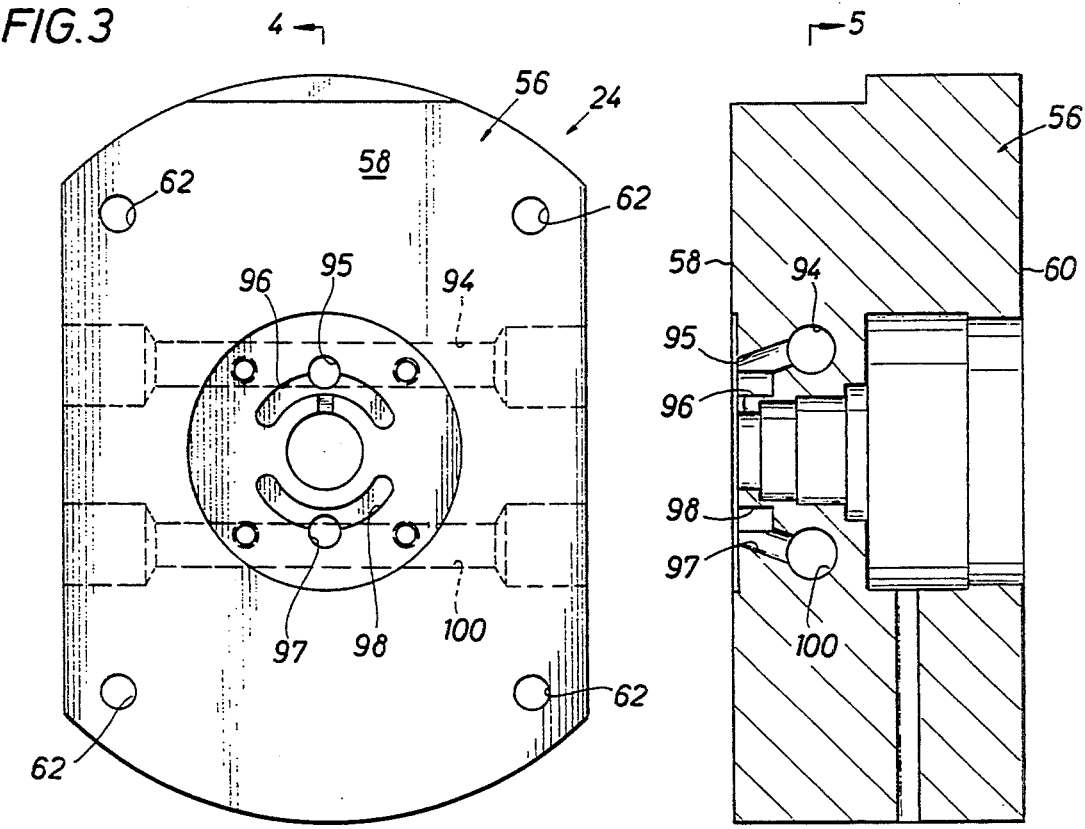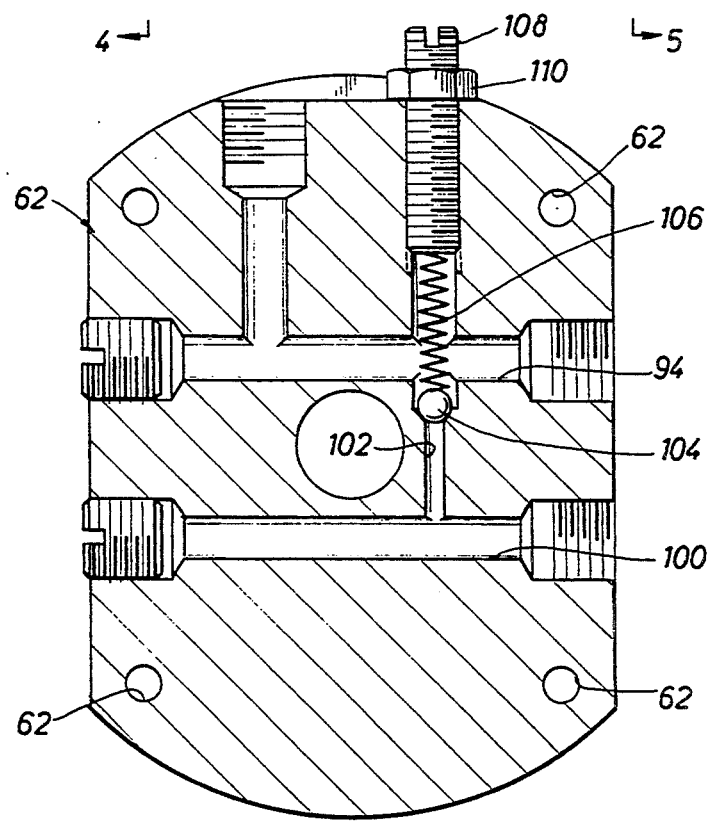

LUBRICANT PUMP FOR A TURBINE

FIELD OF THE INVENTION

This invention relates to a lubricant pump for the shaft bearings of a turbine and the method of installing the lubricant pump. More particularly, the invention is directed to such a lubricant pump and method of installation for a turbine shaft having a governor coupled to the end of the turbine shaft for controlling the rotational speed of the turbine.

BACKGROUND OF THE INVENTION

The rotational speed of most steam turbines, particularly single stage steam turbines is controlled by a centrifugal governor coupled or mounted on the end of the drive shaft for the turbine. The governor controls the amount of steam supplied to the turbine to permit operation of the turbine at a desired rotational speed under various load conditions.

As an example of a governor presently in use for a steam turbine, reference is made to a "TG" type governor manufactured and sold by Woodward Governor Company, Fort Collins, Col., and shown in Manual 04042 dated 1984 of Woodward Governor Company. The governor is driven by the drive shaft of the turbine through a flexible coupling. A pilot valve of the governor is responsive to a change in the rotational speed of the turbine and is movable in either a raised upward direction resulting from an increase in rotational speed or a lowered downward direction resulting from a decrease in rotational speed. If load on the turbine increases which reduces the speed of the turbine, the pilot valve is lowered to effect an increase in the amount of steam supplied to the turbine. If load on the turbine decreases which increases the speed of the turbine, the pilot valve is raised to effect a reduction in the amount of steam supplied to the turbine.

When utilizing steam turbines in refineries, chemical plants, saw mills, and the like, steam temperature and turbine speeds often exceed certain limits and pressurized lubrication is necessary for the beatings of the turbine shaft in order to provide adequate cooling for the bearings. A separate oil pump and motor tier driving the oil pump can be provided for this purpose. However, the utilization of a separate external pump is not preferred. It is preferred to provide an oil pump for supplying pressurized lubrication to the bearings which is driven from the turbine shaft and does not require a separate external motor or other drive means for driving the oil pump.

Heretofore, an oil pump has been coupled to a turbine shaft between the governor and a turbine bearing for supplying pressurized lubrication to the bearings for the turbine. However, the governor and the adjacent bearing housing have been modified to receive the oil pump therebetween. Also, a substantially rigid coupling was provided between the governor shaft and the pump shaft. Thus, the oil pump heretofore was not suitable as a retrofit between a previously existing governor and an adjacent bearing housing.

SUMMARY OF THE INVENTION

The present invention is directed to a lubricant pump for providing pressurized lubricant to the bearings for a steam turbine which has a governor coupled to the turbine shaft for controlling the rotational speed of the turbine. The lubricant pump is positioned between the governor and the adjacent bearing for the turbine shaft. The pump has a shaft coupled on one end to the turbine shaft through a flexible coupling and coupled on its other end to the governor shaft through a flexible coupling. Thus, both the pump shaft and the governor shaft are driven from the turbine shaft.

A governor when mounted without the lubricant pump of the present invention is coupled to an end of the turbine shaft and has a housing which is bolted directly to the adjacent bearing housing. The governor is easily removed from the end of the turbine shaft by removal of the bolts from the bearing housing and disconnection of the coupling between the governor shaft and the turbine shaft.

The lubricant pump of the present invention is adapted for connection to the turbine shaft and adjacent bearing housing in the same manner as the governor. Also, the pump is adapted for connection to the governor shaft and housing so that the governor can be mounted to the pump in generally the same manner as the governor was previously connected to the turbine shaft and bearing housing. Thus, the lubricant pump may be easily installed between the governor and bearing housing without any substantial changes in the governor and bearing housing.

The method of installing the lubricant pump as a retrofit unit in situ on an existing steam turbine includes the steps of first removing the governor housing from the adjacent bearing housing, and uncoupling the governor shaft from the turbine shaft. The governor flexible coupling is next removed and installed on the pump shaft. The lubricant pump is then connected to the governor with the pump shaft and governor shaft coupled to each other. Next, the governor together with the pump is bolted to the bearing housing with the pump shaft being coupled to the turbine shaft.

An object of this invention is to provide a lubricant pump for providing pressurized lubricant to the bearings of a steam turbine which has a governor for controlling the rotational speed of the turbine.

Another object of this invention is to provide such a lubricant pump which is positioned between the governor and the adjacent bearing for the turbine shaft with the pump and governor being driven from the turbine shaft.

A further object of this invention is the method of installing such a lubricant pump as a retrofit unit on an existing steam turbine between the governor and adjacent bearing housing without any substantial modification to the governor and bearing housing.

Other objects, features, and advantages of the invention will become more apparent after referring to the following specification and drawings.

BRIEF DESCRIPTION OF THE DRAWINGS

FIG. 1 is a schematic view of the present invention showing the lubricant pump of the present invention positioned between the governor and adjacent bearing for a steam turbine;

FIG. 3 is an end elevational view of the outer pump housing which is adapted to have a pump body mounted thereon and looking generally along line 3—3 of FIG. 6;

FIG. 4 is a section taken generally along line 4—4 of FIG. 3;

FIG. 5 is a transverse sectional view taken through the outer housing of the pump generally along line 5—5 of FIG. 4;

FIG. 7 is a view taken generally along line 7—7 of FIG. 6 and showing the flexible coupling between the governor shaft and the pump shaft;

FIG. 8 is a view taken generally along line 8—8 of FIG. 6 and showing the gear for the pump.

PRIOR ART

Figure 1A:
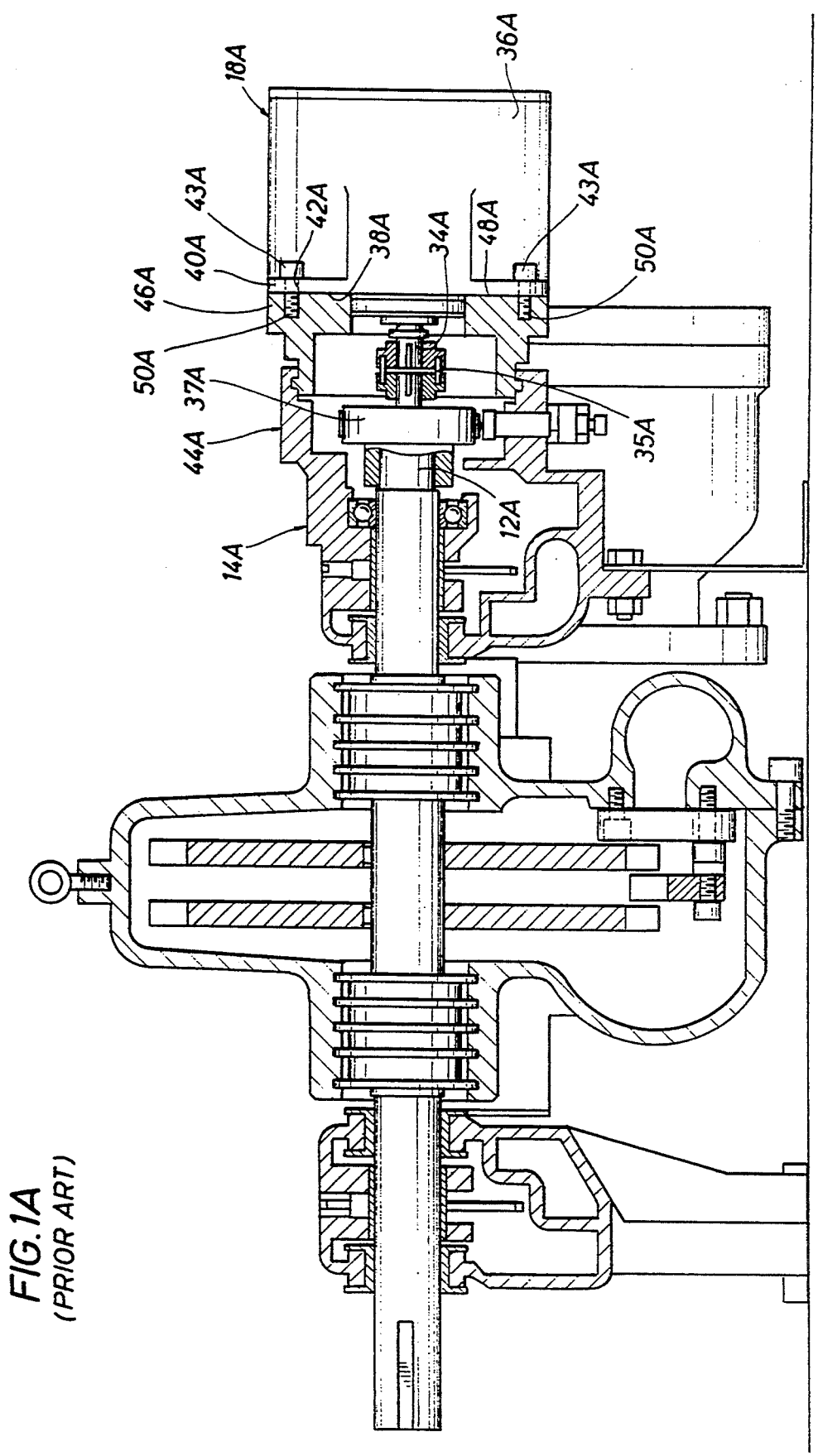
FIG. 1A is an example of the prior art showing a governor mounted directly to a bearing housing for a bearing of a turbine shaft without a lubricant pump.

As an example of the prior art before the addition of the lubricant pump of the present invention, reference is made to FIG. 1A in which governor 18A is shown connected directly to end bearing 14A. Governor 18A has a shaft 34A which is coupled at 35A to overspeed trip assembly 37A for turbine shaft 12A and is driven from shaft 12A. Governor 18A has an outer housing 36A including a planar end mounting face 38A and four mounting lugs or flange portions 40A adjacent face 38A. Mounting lugs 40A include openings 42A to receive suitable bolts 43A for mounting of governor 18A. Adjacent bearing 14A has a beating housing 44A which includes an end adapter 46A having a planar end face 48A with internally threaded openings 50A therein to receive the externally threaded mounting bolts 43A for mounting governor 18A with opposed faces 38A and 48A in contact relation. Governor 18A before the present invention adding the lubricant pump is bolted directly to end face 48A of bearing housing 44A with bolts 43A extending through openings 42A within mounting lugs 40A.

.DESCRIPTION OF THE INVENTION

Referring now to the drawings for a better understanding of the invention and more particularly to FIG. 1, the lubricant pump of the present invention is shown schematically in an installed position on a steam turbine generally indicated at 10. Steam turbine 10 has a turbine shaft 12 mounted for rotation in bearings generally indicated at 14. A generator or other driven machine indicated in broken lines at 16 is driven by turbine 10 as well known. A governor 18 is coupled to turbine shaft 12 and controls the steam supply through line 20 to turbine 10 by suitable valve means shown at 22. A governor which has been found to be satisfactory for a steam turbine is a "TG" type governor manufactured by Woodward Governor Company, Fort Collins, Col., and illustrated in Manual 04042 dated 1984 of Woodward Governor Company. It is to be understood that other governors driven from a turbine shaft may be utilized satisfactorily with the present invention.

The lubricant pump comprising an important part of this invention is shown generally at 24 positioned between governor 18 and adjacent bearing 14. Lubricant or oil from an oil reservoir or sump 26 supplies lubricant through line 28 to lubricant pump 24 and lubricant is pumped through lines 30 and 32 to beatings 14 for supplying pressurized lubricant to bearings 14. The lubricant is returned to oil sump 26 through separate return lines, not shown. Pressurized lubricant for bearings 14 is particularly desired when the rotational speed of turbine 10 or the steam temperature exceeds particular limits.

Figure 2:
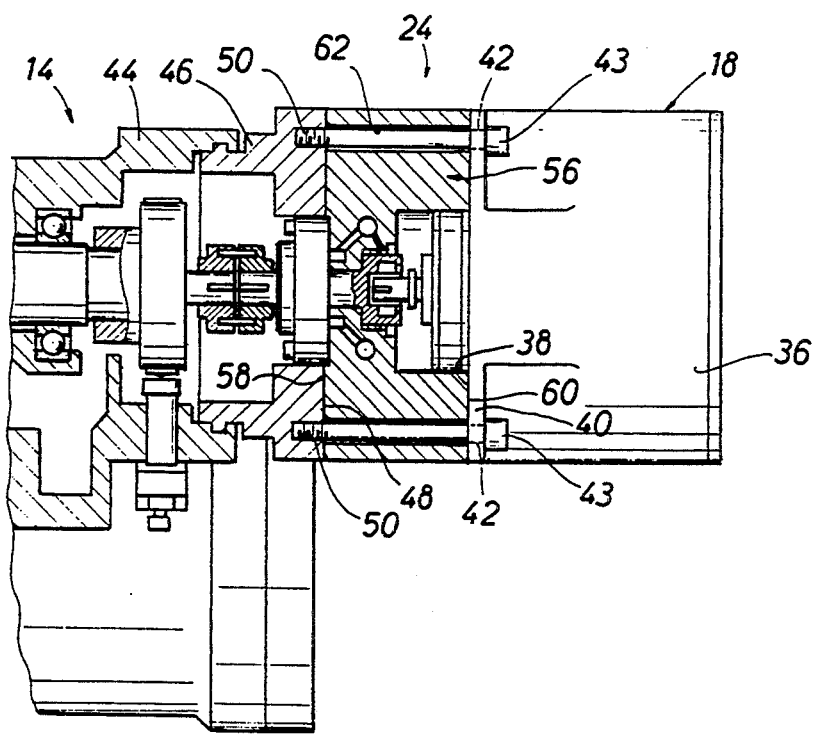
FIG. 2 is a longitudinal sectional view of a lubricant pump comprising the present invention shown coupled at one end to the governor shaft and coupled at the other end to the drive shaft for the steam turbine.

Referring now particularly to FIG. 2, reference characters for governor 18 and for bearing housing 14 are employed which are similar to FIG. 1A with the letter A removed. Governor 18 has an outer housing 36 including planar end mounting face 38 and four mounting lugs 40 adjacent face 38. Mounting lugs 40 include openings 42 to receive bolts 43 for mounting of governor 18. Adjacent bearing 14 has a bearing or adapter housing 44 which includes an end adapter 46 having a planar end face 48 with internally threaded openings 50 therein receiving externally threaded mounting bolts 43.

Lubricant pump 24 is an internal gear pump and is particularly adapted for fitting between planar face 38 of governor 18 and planar face 48 of adapter 46 of bearing housing 44. Lubricant pump 24 includes an outer housing or adapter 56 having a planar mounting face 58 on one end in contact relation with mounting face 48 on bearing housing 44, and a parallel planar mounting face 60 on an opposed side in contact relation with mounting face 38 of governor 18. Four openings 62 extend through outer housing 56 in axial alignment with openings 42 of governor 18 and internally threaded openings 50 in bearing housing 44. Long length externally threaded bolts 43 extend through openings 42, 62 and are threaded within internally threaded openings 50 of bearing housing 44 for mounting governor 18 and lubricant pump 24 thereon.

Figure 6:
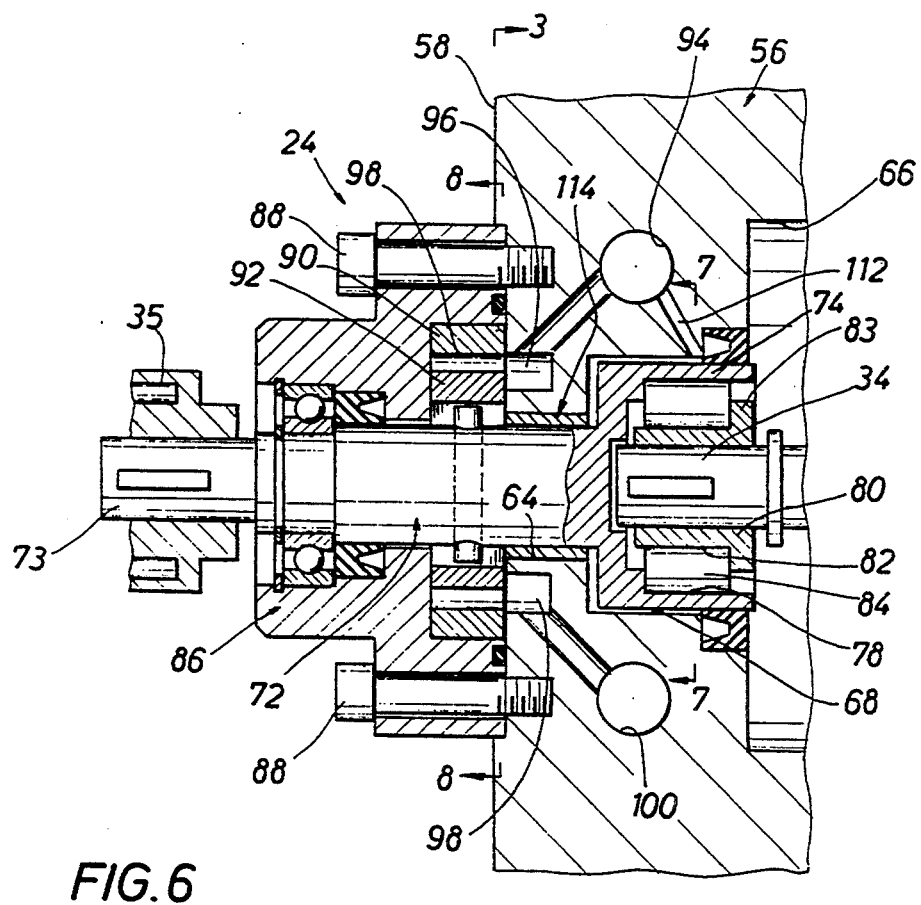
FIG. 6 is an enlarged fragment of FIG. 2 showing the pump and pump housing.

As shown in FIGS. 6, 7 and 8, a central bore extends through outer housing 56 defining a small diameter bore portion 64, a large diameter bore portion 66, and a connecting intermediate diameter bore portion 68. A pump shaft generally indicated at 72 has one end 73 keyed to a coupling 35 which is driven from turbine shaft 12. An outer hub 74 is provided on the other end of shaft 72 and is received within intermediate bore portion 68. Axially extending inner grooves or cutaway portions 78 are provided in the end of hub 74. Governor 18 has a shaft 34 extending therefrom which is keyed to an inner hub 80. Inner hub 80 has outer notches or cutaway portions 82 mating with grooves 78 to form cylindrical openings and a flange 83 extends over notches 82. A plurality of cylindrical elastomeric force transmitting members 84 are received within mating grooves 78, 82 to form a coupling between governor 18 and pump 24 for transmitting torque loads from pump shaft 72 to governor shaft 34. Elastomeric members 84 may be formed of urethane and have a limited resilience, such as around 0.002 inch, to provide a flexible coupling between pump shaft 72 and governor shaft 34.

Rotary internal gear pump 24 includes an inner pump body generally indicated at 86 mounted by bolts 88 to face 58 of outer housing 56. Pump body 86 has a pump chamber and an inner gear 92 secured to shaft 72 is mounted within the pump chamber. Inner gear 92 fits within an outer gear 90 and generally has one tooth less than outer gear 90 so that outer gear 90 rotates at a lesser speed than inner gear 92. Outer gear 90 is mounted eccentrically relative to shaft 72 and gear 92. Line 28 from lubricant reservoir or sump 26 is connected to suction or inlet passage 94 in communication with arcuate inlet chamber 96 through port 95. Lubricant is distributed by gears 90 and 92 to arcuate outlet chamber 98 in communication with pressure or outlet passage 100 through port 97. Outlet passage 100 is connected to outlet 30 for supplying pressurized lubricant through lines 30 and 32 to bearings 14 as shown in FIG. 1. Lubricant is preferably supplied to bearings 14 at a pressure of around 7 to 10 psi. To maintain the lubricant below a predetermined maximum pressure, a lubricant relief passage 102 is provided between inlet passage 94 and outlet passage 100. A ball valve member 104 is urged by a compression spring 106 into a seated position normally blocking the flow of lubricant through passage 102. The compression of spring 106 may be predetermined by threaded stem 108 secured by lock nut 110. Ball valve member 104 may be set to unseat at 8 psi, for example, to provide communication between inlet and outlet passages 94, 100 for the relief of lubricant pressure in outlet passage 100 at a pressure above 8 psi. Ball valve member 104 reseats upon a decrease in the lubricant pressure to the predetermined level thereby to maintain the pressurized lubricant below the predetermined pressure, such as 8 psi. Lubricant is also supplied through branch passage 112 from inlet passage 94 to bearing 114 for shaft 72 as shown in FIG. 6.

Lubricant pump 24 is suitable for either clockwise or counterclockwise rotation of turbine 10. As shown in the drawings, turbine 10 and pump 24 are mounted for rotating in a counterclockwise direction as viewed in FIG. 8. If turbine 10 rotates in an opposite clockwise direction, pump body 86 is mounted on outer housing 56 at 180° from the position of FIG. 8 without any piping changes required.

Figure 9:
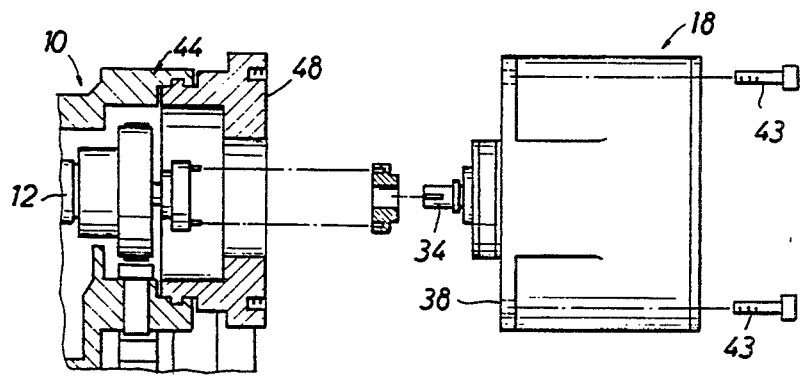
FIGS. 9-12 are sequential views showing the steps in the method of installing the pump of the present invention in situ between an existing governor and bearing housing of a steam turbine.
Figure 10:
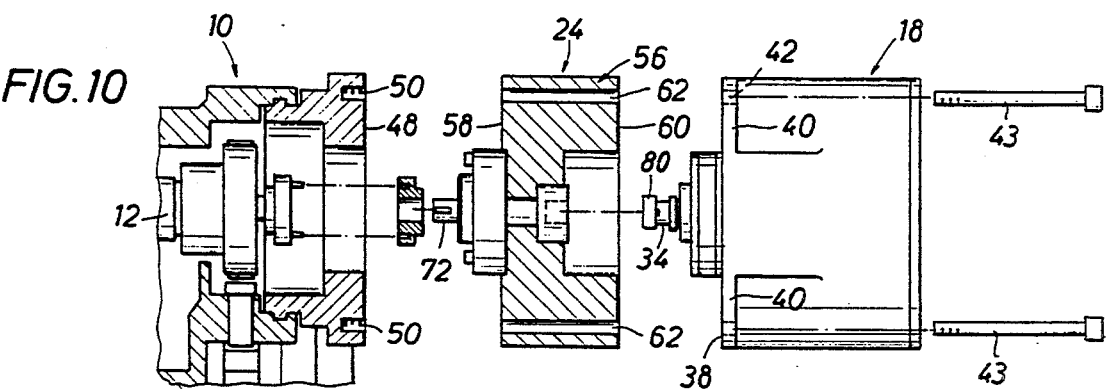
Figure 11:
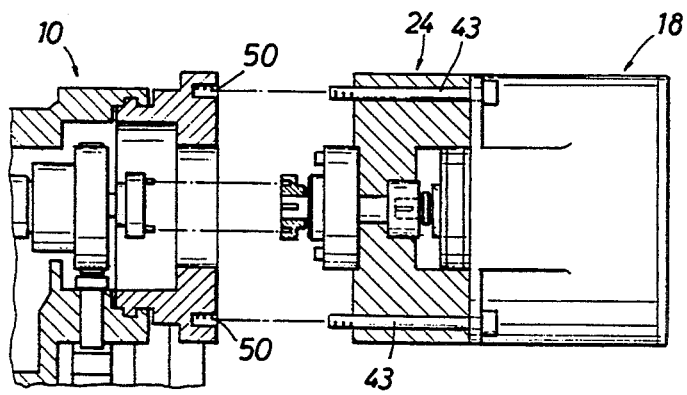
Figure 12:
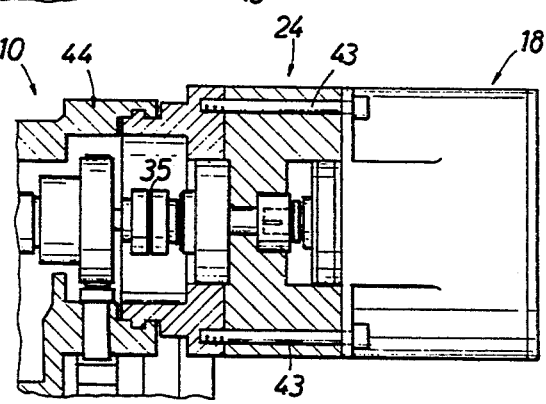

As indicated above, lubricant pump 24 may be provided as a retrofit unit on an existing steam turbine such as shown in FIG. 1A in which a governor is secured to a bearing housing for the turbine shaft. No modification of the existing governor or the existing bearing housing is necessary as lubricant pump 24 is particularly designed for fitting between the governor and the bearing housing of an existing steam turbine. For installation of lubricant pump 24 and referring to FIGS. 9-12, governor 18 is first removed from bearing housing 46 by removal of short length bolts 43 and governor shaft 34 having keys thereon is slipped outwardly from turbine shaft 12 for uncoupling as shown particularly in FIG. 9. Governor 18 is then connected to pump 24 by insertion of governor shaft 34 within hub 80 with force transmitting cylindrical members 84 being positioned within notches 82 between hub 80 and outer hub 74. Openings 42 in lugs 40 of governor 18 are aligned with openings 62 extending through pump housing 56 and long length bolts 43 are inserted within aligned openings 42 and 62 to form a subassembly as shown in FIG. 11. The subassembly of governor 18 and lubricant pump 24 with bolts 43 aligned with internally threaded openings 50 is then connected to bearing housing 44 as shown in FIG. 12. Shaft 72 having keys thereon is slipped within coupling 35 prior to the threading of bolts 43 into tight engagement with openings 50 of bearing housing 44. Thus, no modification of governor 18 and bearing housing 44 has been required for installation of lubricant pump 24 between governor 18 and bearing housing 44.

It now will be recognized that a lubricant pump for a steam turbine and method of installation has been disclosed which meets all of the objectives of the present invention, and which incorporates numerous unique features and advantages as set forth herein. Since certain changes or modifications may be made in the disclosed embodiment without departing from the inventive concepts involved, it is the aim of the appended claims to cover all such changes and modifications falling within the true spirit and scope of the present invention.

What is claimed is:

1. In a turbine having a shaft mounted for rotation on a pair of bearings on opposite sides of the turbine with one of the bearings having a bearing housing including an outer planar face, and a governor having a shaft extending coaxially with the turbine shaft for controlling the rotational speed of said turbine; a pressurized lubricant system for said bearings comprising:
   a lubricant pump between the governor and outer planar face of said bearing having a shaft connected coaxially to the turbine shaft; said lubricant pump including a planar face in face to face contact with said outer planar face of said bearing housing;
   a lubricant line extending between said pump and said bearings for the supply of pressurized lubricant to said bearings;
   a coupling between said pump shaft and said governor shaft; and
   means connecting said governor, pump, and bearing housing together.

2. In a turbine as set forth in claim 1;
   said coupling being a flexible coupling having a hub on said governor shaft and resilient means between said hub and said pump shaft to provide a limited predetermined flexibility between said governor shaft and said pump shaft.

3. In a turbine as set forth in claim 2;
   an end hub on said pump shaft of a diameter greater than said hub on said governor shaft and receiving said governor shaft hub therein; and
   said flexible coupling connected between said pump shaft hub and said governor shaft hub.

4. In a turbine as set forth in claim 3 wherein;
   said governor shaft hub and said pump shaft hub have mating cutaway portions defining a plurality of arcuately spaced recesses therein; and
   said resilient means comprising a plurality of resilient force transmitting members mounted within said recesses for transmitting torque between said hubs.

5. Apparatus for providing pressurized lubricant to a pair of bearings mounted on opposite sides of a turbine shaft, said apparatus adapted to be mounted between a governor coupled to an end of the turbine shaft and a housing for the adjacent bearing; said apparatus comprising:
   a lubricant pump having an outer housing defining a pair of opposed generally parallel planar faces;
   lubricant lines extending between said pump and said bearings for the circulation of pressurized lubricant to said bearings;
   a pump shaft coupled to the turbine shaft;
   a governor shaft coupled to the pump shaft;
   an outer housing extending about the governor and including a planar mounting face;
   an outer housing said bearing housing comprising extending about said adjacent bearing and having a planar end mounting face; and
   securing means removably connecting said pump housing between said outer housing of said adjacent bearing and said outer housing of said governor with said opposed planar faces of said pump housing in face to face contact with said planar mounting faces of the outer housings of said governor and said adjacent bearing.

6. Apparatus as set forth in claim 5 wherein:
said securing means comprises removable bolts extending through said pump housing.

7. Apparatus as set forth in claim 5 wherein:
said lubricant pump includes lubricant regulating means to maintain the lubricant pressure to said bearings below a predetermined maximum amount.

8. Apparatus as set forth in claim 7 wherein:
a lubricant inlet passage is in fluid communication with a lubricant inlet chamber for said pump and a lubricant outlet passage is in fluid communication with a lubricant outlet chamber for said pump; and
a lubricant relief passage extends between said inlet passage and said outlet passage having a normally closed valve member therein movable to an open position at a predetermined high lubricant pressure in said outlet passage for relieving excess pressure in said outlet passage.

9. Apparatus as set forth in claim 5 wherein:
said lubricant pump comprises an internal gear pump having a pump chamber for an inner gear secured to said pump shaft for rotation and an outer gear receiving said inner gear in eccentric relation;
a lubricant inlet to said chamber; and
a lubricant outlet from said chamber in fluid communication with said lubricant lines to said bearings to provide pressurized lubricant to said bearings.

10. Apparatus as set forth in claim 9 wherein:
a pump body is mounted externally on the planar face of said pump housing adjacent said bearing housing; and
said pump shaft extends through said pump housing and has a hub thereon.

11. A lubricant pump assembly adapted to be positioned between a governor and a bearing for a shaft of a steam turbine for lubricating said bearing, and to be coupled coaxially with the turbine shaft and a shaft for the governor; said lubricant pump assembly comprising:
a lubricant pump having a pump housing including a pair of opposed parallel planar faces adapted to be positioned against opposed planar faces of adjacent housings for said governor and said bearing;
a pump body secured to said pump housing adjacent the bearing housing;
a pump shaft extending through said pump body and said pump housing for coupling to said turbine shaft; and
means for securing said pump housing between said opposed planar faces of adjacent housings for said governor and said bearing.

12. A lubricant pump assembly as set forth in claim 11 wherein:
means mount said pump body for adjustable movement to adapt said pump assembly for rotation of said turbine in either direction of rotation.

13. A lubricant pump assembly as set forth in claim 11 wherein:
said pump shaft has an integral hub for coupling to said governor shaft, and said governor shaft has a hub received within said hub of said pump; and
flexible coupling means couple said hubs to each other.

14. A lubricant pump assembly as set forth in claim 13 wherein:
said flexible coupling means comprises mating portions on said hubs defining a plurality of associated spaced recesses therein; and
a plurality of resilient force transmitting members are mounted within said recesses for transmitting torque between said hubs.

15. A lubricant pump assembly adapted to be positioned between a governor and a bearing for a shaft of a steam turbine for lubricating said bearing, and to be coupled coaxially with the turbine shaft and a shaft for the governor; said lubricant pump assembly comprising:
a lubricant pump having a pump housing adapted to be positioned between opposed housings for said governor and said bearing;
a pump shaft extending through said pump housing for coupling to said turbine shaft; and
means for securing said pump housing between said opposed housings for said governor and said bearing.

16. A lubricant pump assembly as set forth in claim 15 wherein:
said pump shaft has a hub received within said pump housing for coupling to said governor shaft;
said governor shaft has a hub received with said hub of said pump; and
flexible coupling means couple said hubs to each other.

17. A lubricant pump assembly as set forth in claim 16 wherein:
said flexible coupling means comprises mating portions on said hubs defining a plurality of associated spaced recesses therein; and
a plurality of resilient force transmitting members are mounted within said recesses for transmitting torque between said hubs.

18. A lubricant pump assembly as set forth in claim 15 wherein:
a plurality of removable bolts extend through said pump housing for securing said pump housing to said opposed housings for said governor and said bearing.

* * * * *